US012795452B2

(12) United States Patent
Park et al.

(10) Patent No.: US 12,795,452 B2
(45) Date of Patent: Nov. 10, 2026

(54) LINK QUALITY ANALYZER AND ASSOCIATED SYSTEMS

(71) Applicant: The Johns Hopkins University, Baltimore, MD (US)

(72) Inventors: Jae Y. Park, Columbia, MD (US); Florendo S. Encarnado, Columbia, MD (US); Christopher R. Flint, Laurel, MD (US); Keith H. Redwine, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 705 days.

(21) Appl. No.: 18/312,274

(22) Filed: May 4, 2023

(65) Prior Publication Data

US 2023/0362736 A1 Nov. 9, 2023

Related U.S. Application Data

(60) Provisional application No. 63/338,059, filed on May 4, 2022.

(51) Int. Cl.
*H04W 28/18* (2009.01)
*H04L 1/00* (2006.01)
*H04W 24/08* (2009.01)

(52) U.S. Cl.
CPC ........... *H04W 28/18* (2013.01); *H04L 1/0061* (2013.01); *H04L 1/0071* (2013.01); *H04W 24/08* (2013.01)

(58) Field of Classification Search
None
See application file for complete search history.

(56) References Cited

U.S. PATENT DOCUMENTS 10,098,117 B2 * 10/2018 Nasiri Khormuji ...... H04L 1/18
2016/0234844 A1 * 8/2016 Nasiri Khormuji .... H04L 5/005

* cited by examiner

*Primary Examiner* — Willie J Daniel, Jr.
(74) *Attorney, Agent, or Firm* — Sung T. Kim

(57) ABSTRACT

A communications system may include a transmitter, a receiver, and a link analyzer. The transmitter may be configured to encode a message with an error correction code, and also modulate and transmit the encoded message via a communications link. The receiver may be configured to receive the message via the communications link, demodulate the transmission to generate demodulated coded information, and decode the demodulated coded information using the error correction code to generate a decoded message. The link analyzer may be configured to re-encode the decoded message to generate re-encoded information, compare the re-encoded information to the demodulated coded information, and generate a link quality metric value based on the comparison of the re-encoded information with the demodulated coded information. The link quality metric value may be indicative of a link quality of the communications link.

17 Claims, 5 Drawing Sheets

LINK QUALITY ANALYZER AND ASSOCIATED SYSTEMS

CROSS-REFERENCE TO RELATED APPLICATIONS

This application claims the benefit of U.S. Provisional Patent Application No. 63/338,059 filed on May 5, 2022, the entire contents of which are hereby incorporated herein by reference.

TECHNICAL FIELD

Exemplary embodiments generally relate to communications technology, and more specifically relate to the analysis of link or channel quality, particularly in the context of communications systems that implement error correction coding.

BACKGROUND

Noise on a communications channel or link can be caused by a variety of sources. For example, noise can be caused by nearby electrical equipment that generate radio frequency noise due to faulty components, poor electrical connections, or the like. Additionally or alternatively, noise can be the result of interference created by other communications devices attempting to use the same communications link. Further, the effects of multipath signals and fading conditions can also contribute to noise or otherwise reduce the signal strength or phase of a transmitted signal. Noise and other conditions on a communications link can also change over time due to, for example, relative movement between a transmitter and a receiver and other environmental dynamics.

As a result of the noise on the link, regardless of the source, a transmitted signal can become difficult to extract. In other words, for communications links having a low signal-to-noise (SNR) ratio, it can be difficult to distinguish between a desired signal and the communications link noise, and therefore extracting of the desired signal from a received transmission can be difficult. Additionally, since the noise and other conditions on a communications link are often changing, the SNR may change over time resulting in associated changes in the quality of the communications link.

To alleviate some of the issues caused by noise, error correction techniques have been have been developed and employed. Such techniques often involve adding additional, redundant, information to a transmitted message through an encoding process, and this additional information may be used to correct errors in the received message. In some instances, such error correction is highly effective, resulting in decoded messages having no errors. As a result, the difference between a message delivered via a low noise or high quality communications link and one delivered via a high noise or low quality communications link cannot be determined from the decoded message. However, there are a number of benefits that can be realized if information regarding the quality of the link is known, even when an error-free message has been obtained.

BRIEF SUMMARY OF SOME EXAMPLES

According to some example embodiments, a communications system comprising a transmitter, a receiver, and a link analyzer is provided. The transmitter may be configured to encode a message with an error correction code, and also modulate and transmit the encoded message via a communications link. The receiver may be configured to receive a transmission associated with the message via the communications link, demodulate the transmission to generate demodulated coded information, and decode the demodulated coded information using the error correction code to generate a decoded message. The link analyzer may be configured to re-encode the decoded message to generate re-encoded information, compare the re-encoded information to the demodulated coded information, and generate a link quality metric value based on the comparison of the re-encoded information with the demodulated coded information. The link quality metric value may be indicative of a link quality of the communications link.

According to some example embodiments, a communications receiver system is provided. The communications receiver system may comprise a receiver and a link analyzer. The receiver may be configured to receive, from a transmitting device, a transmission associated with a message via a communications link. The receiver may be further configured to demodulate the transmission to generate demodulated coded information, and decode the demodulated coded information using an error correction code for the transmission to generate a decoded message. The link analyzer may be configured to re-encode the decoded message to generate re-encoded information, compare the re-encoded information to the demodulated coded information, and generate a link quality metric value based on the comparison of the re-encoded information with the demodulated coded information. The link quality metric value may be indicative of a link quality of the communications link.

According to some example embodiments, a method for determining a quality of a communications link is provided. The method may comprise receiving, at a receiving device, a transmission associated with a message transmitted via a communications link from a transmitting device. The method may further comprise demodulating the transmission to generate demodulated coded information, decoding the demodulated coded information using the error correction code of the transmission to generate a decoded message, and re-encoding, by a link analyzer, the decoded message to generate re-encoded information. Additionally, the method may comprise comparing the re-encoded information to the demodulated coded information, and generating a link quality metric value based on the comparison of the re-encoded information with the demodulated coded information. The link quality metric value may be indicative of a link quality of the communications link.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
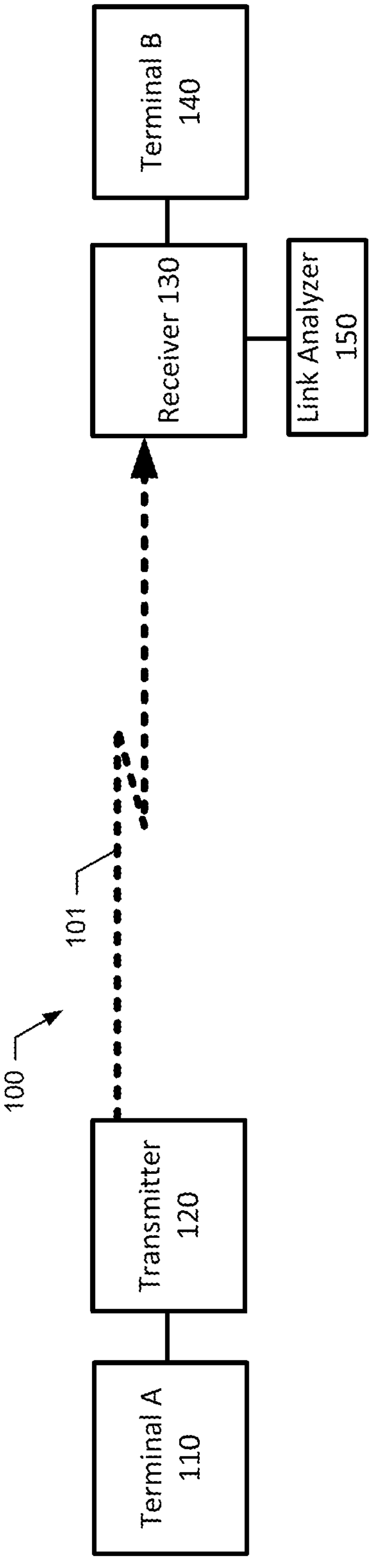
FIG. 1 illustrates an example communications system configured to determine a link quality metric value according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As provided herein, the term "or" is intended to have the meaning of the logical "or" operator (in contrast to the exclusive "or" operator) such that A or B means that A is an option, B is an option, and A and B together are an option.

In view of the foregoing, according to some example embodiments, systems, apparatuses, and methods are described herein that operate to determine a link quality metric value that indicates the quality of the link being used for communications between a transmitter and receiver, and then, according to some example embodiments, use the link quality metric value to control transmission parameters used in association with the communications link to, for example, optimize for power consumption or data rate. In this regard, according to some example embodiments, a link analyzer may be implemented that is configured to compare demodulated coded information associated with a received message captured prior to decoding with re-encoded information generated by re-encoding the decoded message. The comparison of the demodulated coded information with the re-encoded information can be used to ascertain the quality of the communications link because the demodulated coded information still includes errors caused by conditions of the communications link and the re-encoded information can be used as a benchmark since the re-encoded information is a perfect reproduction of the coded message prior to transmission via the communications link. Therefore, according to some example embodiments, a value based on a difference between the demodulated coded information and the re-encoded information may change only in response to changes in the quality of the communications link or channel. Additionally, because encoded information is being compared, the approach, according to some example embodiments, is agnostic as to the coding scheme that is implemented. Accordingly, such a link quality metric based on this comparison correlates with the bit error rate (BER) introduced by the communications link, and can therefore be reliably used as a basis for modifying transmission parameters to optimize performance of the communications system. More specifically, transmission parameters such as transmitted power level or a code rate for encoding can be modified based on the determined link quality metric for optimization purposes. Further, modification to other or related transmission parameters may be performed based on the link quality metric, such as, for example, modifications to modulation and waveform attributes. Also, the value of the link quality metric may be determined on a repeated basis to identify and respond to changes in the quality of the communications link with respect to time by communicating desired changes to transmission parameters.

The link quality metric value, according to some example embodiments, may be determined in a communications system that employs error correction coding, and more specifically, forward error correction (FEC) coding. FEC involves an error correction technique that introduces some degree of redundancy to the content of a message prior to transmission, and the redundancy can be used at the receiver to correct errors caused by the quality of the communications link. In this regard, errors introduced by the communications link can be remedied when the received message is decoded and the redundancies are used to correct the introduced errors.

As such, a message for transmission may be encoded using a given FEC coding scheme prior to modulation and transmission, and then the received message may be decoded using the FEC coding scheme at a receiver after demodulation. The decoding process may include detection and correction of errors within the received message such that, after decoding, the output message (e.g., provided as bits, words, etc.) includes no errors. The transmitter and receiver with a communications system employing FEC are both aware of the coding scheme that has been implemented, and therefore decoding can be performed based on the coding scheme. The decoding process involves performing data checks on the data of the received message using the redundant error-correcting coded bits, which may be referred to as symbols. Upon completion of the decoding, the redundancies used in the decoding are discarded and the decoded message is provided for content processing without errors. Accordingly, the errors in the received message caused by noise and or other conditions introduced by the communications link (also referred to as the communications channel) can be corrected without having to, for example, request retransmission of the original message due to errors introduced by the communications link.

Further, FEC coding may be performed based a desired code rate. The code rate indicates the degree to which redundancies are introduced to a message in order to ensure that an error-free decoding of the message can be performed at the receiver. In this regard, for example, implementation of a half-code rate system involves the generation of two encoded bits (or symbols) for each data bit of the message. As such, in a half-code rate implementation, the data rate for the communication is cut in half because twice as many bits are transmitted for the same message. Changes in the code rate of the error correction coding may result in changes in the waveform used for the communications system. Accordingly, via changes to the code rate, more or less reliability can be introduced to the communications.

A variety of code schemes may be used in an FEC communication system. For example, block codes or convolutional codes may be used. Implementation of a block code may involve dividing a message into a number of fixed-length blocks of bits. The block coding process may involve, for example, adding redundant bits to each block to be used for error correction. On the other hand, a convolutional coding approach may be implemented in the context of messages that are, for example, arbitrary length data streams. For convolutional coding, parity symbols may be generated and added to the data streams for use in error correction. In some instances, the parity symbols may be generated via, for example, a sliding implementation of a Boolean function.

Beyond the more general context of block and convolutional FEC codes, more specific error correction coding implementations within these categories nay be implemented. In this regard, for example, a hamming code may be used. A hamming code may be a type of block code that allows for two simultaneous bit errors to be detected and single-bit errors to be corrected. A second example is a binary convolution code, which operates to process an input message as a sequence of bits of arbitrary length and generates an encoded output sequence of those bits. Further, a Reed-Solomon code may implemented as a block code that can correct burst errors in the received message. As a final example, a low-density parity check code may be implemented as a block code that uses a parity-check matrix containing a low-density of ones or true bits. Such low-density parity check coding may be implemented with use of large block sizes in very noisy, low quality communication links.

As mentioned above, the implementation of FEC coding is intended to result in no errors in the received, decoded message. The redundancies introduced to achieve this outcome can require high overhead with regard to the needed processing power and reduced data rates to use the coding. In this regard, implementation of a specific FEC coding scheme may require, for example, a dedicated field programmable gate array (FPGA) for implementing the encoding at the transmitter and at the receiver for decoding. Additionally, because data rates are reduced in exchange for highly reliable communications, FEC coding may be appropriate for use in communications systems where high reliability is a requirement to avoid any need for retransmission, and slower data rates are acceptable drawback in exchange for such reliability. For example, a deep space probe may be an implementation that might benefit from FEC coding. In such an implementation, a communicated message may take several minutes to receive given the distances involved, and therefore high reliability is desirable at the expense of slower data rates for a message to avoid the need for retransmissions.

Figure 2:
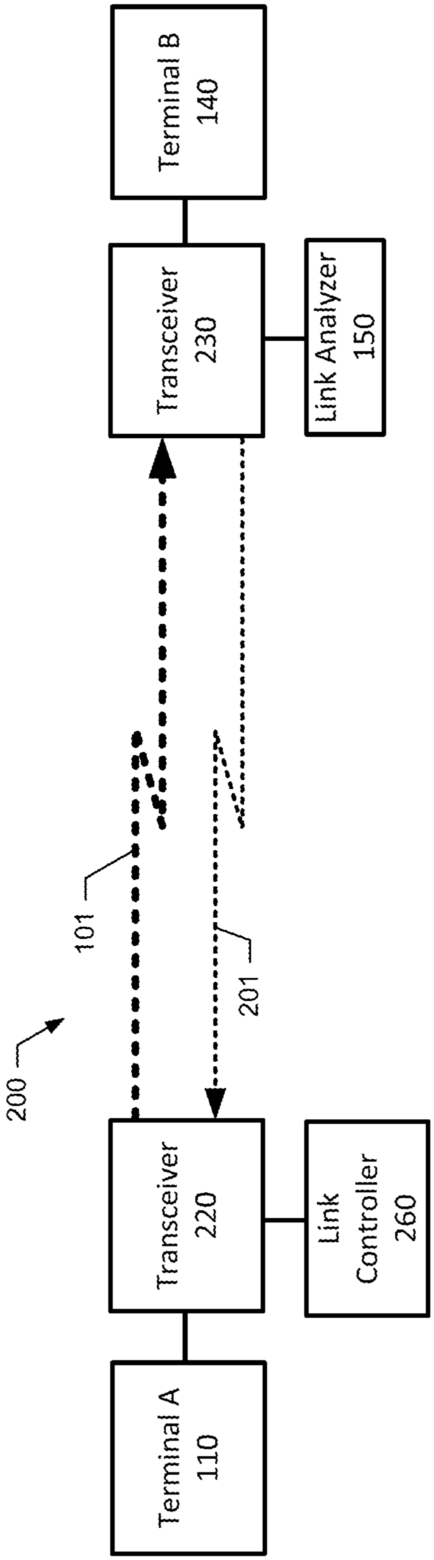
FIG. 2 illustrates another example communications system configured to determine a link quality metric value and support the use of link feedback controls according to some example embodiments.

In consideration of the foregoing, FIGS. 1 and 2 illustrate block diagrams of example communications systems that implement error correction coding according to some example embodiments. With respect to FIG. 1, an example communications system 100 is shown. The communications system 100 may comprise a terminal A 110 and a terminal B 140. Terminal A 110 and terminal B 140 may be computing or processing devices that perform local functionalities. In this regard, terminal A 110 and terminal B 140 may be configured to operate as application-level devices (e.g., computing terminals, mobile terminals such as smart phones, or the like) where the applications implemented by terminal A 110 and terminal B 140 involve the exchange and sharing of data between terminal A 110 and terminal B 140 to implement the applications. According to some example embodiments, terminal A 110 may be coupled to a transmitter 120 to transmit a message to a receiver 130 via a communications link 101 for provision to terminal B 140, for example, in support of an application being implemented by terminal A 110 and terminal B 140.

The communications link 101 between the transmitter 120 and the receiver 130 may be affected by a variety of external conditions that can affect the quality of the communications link 101 and cause errors in a transmission. According to some example embodiments, the communications link 101 may be defined, at least in part, by a carrier frequency. Noise on the communications link 101 may be generated from a variety of electromagnetic sources that may detrimentally affect the quality of the communications link 101. For example, other communications devices attempting to use the communications link 101 may create noise in the form of interference on the communications link 101. Additionally, non-communications related noise sources, such as rotating devices (e.g., motors), electronic components and circuits, poor electrical connections, solar anomalies, and the like may also contribute to the noise and detrimental conditions of the communications link 101. Multipath and propagation-related effects may also raise noise levels or otherwise reduce signal strength or affect the phase of a transmitted signal on the communications link 101. Further, the communications link 101 may be subjected to fading conditions that detrimentally affect the signal strength or phase of a transmitted signal on the communications link 101. These and other conditions may affect the ability to reliably transmit and receive a message via the communications link 101. However, because error correction coding may be implemented at a given power level or code rate in the communications system 100, the detrimental effects of the communications link 101 on a transmitted signal may be overcome to still obtain error-free messages at the receiver 130.

In operation, the terminal A 110 may provide a message to the transmitter 120 to be sent to the terminal B 140 via the communications link 101 and the receiver 130. The transmitter 120 may comprise various components for supporting wireless communications via the communications link 101. In this regard, for example, the transmitter 120 may comprise a radio including a modulator, and an antenna. Further, the transmitter 120 may comprise transmitter processing circuitry configured to control the radio to support the transmission of messages via a communications link 101. The transmitter processing circuitry may also be configured to perform error correction encoding in the form of, for example, forward error correction (FEC) coding as described above and otherwise herein. As such, in preparation for transmission, the transmitter processing circuitry may encode a message using an error correction code, and the encoded message may be transmitted by the transmitter 120 via the communications link 101. In this regard, the encoding may be performed in accordance with a coding scheme (e.g., block coding, convolutional coding, or the like) and a code rate. As mentioned above, examples of coding schemes may include implementation of a hamming code, a binary convolution code, a Reed-Solomon code, a low-density parity check code, or the like. Encoding the message in accordance with an FEC coding scheme may involve converting the message into an encoded message which includes additional information that can be used at a receiving device during decoding to correct errors introduced by the conditions of the communications link 101. As such, the transmitter 120 may be configured to encode the message, modulate the encoded message, and transmit the modulated and encoded message as a transmission via the communications link 101.

Additionally, the transmitter 120 may be configured to encode the message in accordance with a code rate in association with the coding scheme. In this regard, a different waveform for an encoded transmission may result from implementation of a different code rate. As mentioned above, the code rate for an FEC implementation indicates the degree of redundancy introduced to the encoded message as a result of the encoding. A half-code rate introduces two encoded bits for each data bit of the message. As such, the size of the encoded message, relative to the original, non-encoded message, is doubled. The code rate may therefore be defined as $k/n$, where $k$ is the number of bits in the original message and $n$ is the number of bits in the resulting encoded message. Accordingly, the expression $n-k$ provides the number of redundant bits introduce via the encoding.

Therefore, for a lower code rate, e.g., a 1/4 code rate, four encoded bits are introduced for each bit of the original message. Clearly, the introduction of more redundant bits to the encoded message results in a higher likelihood that error correction at a receiver will be successful. However, the increase in the number of redundant bits slows the effective data rate of the transmission due to the increased length of the encoded message.

Also, the transmitter 120 may be configured to send a transmission of the modulated and encoded message at a certain transmit power level. In this regard, a higher power level for the signal can improve the signal-to-noise (SNR) ratio. However, an increased power level may not be desirable in implementations where a power source is limited. For example, in the case of a space probe or other device that may rely on a battery for power, a high transmit power level may be undesirable due to a need for power conservation, particularly if, for example, the SNR is sufficient at lower power levels to realize for reliable communications due to the use of error correction coding.

Accordingly, as further described herein, the code rate and the transmit power level are examples of transmission parameters that, according to some example embodiments, may be modified for optimization of the communications link 101. Other examples of transmission parameters that may be available for modification may include modulation and waveform attributes. Such modifications may be performed based on the quality of the communications link 101. Further, according to some example embodiments, the transmission parameters may be also be modified based on an optimization link quality threshold, and a comparison of the optimization link quality threshold with the link quality metric value.

On the receiver side of the communications link 101, the terminal B 140 may be operably coupled to a receiver 130. Similar to the transmitter 120, the receiver 130 may comprise various components to support wireless communications with the transmitter 120 via the communications link 101. In this regard, for example, the receiver 130 may comprise a radio including a demodulator, and an antenna. Further, the receiver 130 may comprise receiver processing circuitry configured to control the radio to support the receipt of transmissions via a communications link 101. The receiver processing circuitry may also be configured to perform error correction decoding based on a coding scheme, such as an FEC coding scheme, defined for the communications system 100 and implemented at the transmitter 120. The receiver 130 may therefore be configured to receive a transmission via the communications link 101 and demodulate the transmission to generate demodulated coded information. As such, after receipt and demodulation of a transmission, the receiver processing circuitry may decode the demodulated coded information associated with the transmission that was received via the communications link 101, and generate a decoded message that is error-free. In this regard, the decoding may be performed in accordance with a coding scheme (e.g., block coding, convolutional coding, or the like) and a code rate.

Accordingly, the receiver 130 may first demodulate the received transmission to generate demodulated, but still encoded information. Because this demodulated coded information still includes errors introduced by the conditions of the communications link 101, the demodulated coded information could be used to gain insights into the quality of the communications link 101. However, the demodulated coded information is then decoded to generate an error-free, decoded message, which can be provided to the terminal B 140 for processing based on the application related to the message. Because the decoded message has been subjected to error correction, any information regarding the condition of the communications link 101 (which was included in the demodulated coded information) has been removed from the decoded message.

According to some example embodiments, a link analyzer 150 may be implemented with the receiver 130 to obtain information from the receiver 130 for use in determining a link quality metric value. In this regard, the link analyzer 150 may be operably coupled to the receiver 130 to extract information from the receiver 130 to perform an analysis on the communications link 101 and generate a value for a link quality metric that is indicative of the quality of the communications link 101. In other words, the link analyzer 150 may be configured to determine the effect that the communications link 101 is having on a transmission provided by the transmitter 120 to the receiver 130. According to some example embodiments, the link quality metric may be indicative of a bit error rate (BER) introduced by the communications link 101 on a transmitted message. Moreover, the link analyzer 150 may be configured to obtain the demodulated coded information and the decoded message from the receiver 130 for use in determining the link quality metric value.

In this regard, the link analyzer 150 may be configured to re-encode the decoded message based on the coding scheme for the communications system 100 to reproduce the encoded message as generated at the transmitter 120 prior to modulation. The re-encoding process can be recreate the original encoded message because the decoded message is error-free (i.e., does not include errors introduced by the communications link 101). The re-encoded message may be referred to as re-encoded information and, according to some example embodiments, the re-encoded information may be used as a benchmark against the demodulated coded information to determine the effect of the communications link 101 on the associated transmission. In this regard, the demodulated coded information may be compared to the re-encoded information to, for example, to determine a difference or delta that may be used as a value for the link quality metric.

Now referring to FIG. 2, another example communications system 200 is shown that may be configured to leverage a determined link quality metric value as feedback to a transmitting device to modify transmission parameters for the communications system 200. The communications system 200 may include the terminal A 110 and terminal B 140 as described above. However, transmitter 120 may be replaced by a transceiver 220 and receiver 130 may be replaced by a transceiver 230. Transceivers 220 and 230 may include the components and functionalities of both the transmitter 120 and the receiver 130 described above. As such, the transceiver 220 may be configured to operate as a transmitter or a receiver and perform encoding or decoding depending on the mode of operation. Similarly, the transceiver 220 may be configured to operate as a transmitter or a receiver and perform encoding or decoding depending on the mode of operation. In the example scenario of FIG. 2, transceiver 220 is operating as a transmitting device for providing a transmission via the communications link 101 to the transceiver 230, which is operating as a receiving device. As such, with respect to encoding, modulation, transmission via the communications link 101, demodulation, and decoding, the transceiver 220 and the transceiver 230 operate in the same manner as described above with respect to the transmitter 120 and the receiver 130.

However, the link analyzer 150 may be further configured to provide the link quality metric value to the transceiver 230 for delivery, via a communication 201, to the transceiver 220. The transceiver 220 may be operably coupled to a link controller 260, which may be configured to receive the link quality metric value. According to some example embodiments, based on the link quality metric value, the link controller 260 may be configured to modify transmission parameters for future transmissions via the communications link 101. In this regard, for example, the link controller 260 may be configured to modify transmission parameters of future transmissions (e.g., a transmit power level, a code rate, modulation attributes, waveform attributes, or the like) based on the link quality metric value.

Further, according to some example embodiments, the link analyzer 150 may perform further processing based on the link quality metric value to generate a link feedback control for provision and use by the link controller 260 to modify the transmission parameters. In this regard, according to some example embodiments, the link analyzer 150 may be configured to generate a link feedback control based on a comparison of the link quality metric value to an optimization link quality threshold. The optimization link quality threshold may be defined, for example, in association with an link quality having, for example a minimum transmit power level or maximum code rate (i.e., a code rate with minimum redundancies) that that still supports error-free decoded messages at a receiving device. In other words, the optimization link quality threshold may be set such operation of the communications system 200 at the optimization link quality threshold would involve a degree of errors caused by the communications link 101, but still support error-free decoded messages. Accordingly, if the link quality metric value indicates that the link quality at a current transmit power level or current code rate is resulting in very few or no errors being introduced by the communications link 101, then this may be determined based on the comparison of the link quality metric value with the optimization link quality threshold. As such, based on a difference between the link quality metric value and the optimization link quality threshold, link feedback control may be determined that would, for example, reduce the transmit power level or increase the code rate in order to degrade the quality of the link in favor of power savings or increased data rates, respectively. According to some example embodiments, similar modifications to modulation and waveform may be performed based on the optimization link quality threshold. As such, an optimization can be realized by operation of the communications system 200 in association with the optimization link quality threshold.

However, in a FEC system, the link quality can be degraded to a degree that error-free decoded messages can no longer be obtained (i.e., too many errors for correction). Such a link quality may be referred to as a link quality code failure threshold. According to some example embodiments, the optimization link quality threshold may be set to a value that is different, and in some instances substantially different, than the link quality code failure threshold. For example, the optimization link quality threshold may be set to a value that is different from the link quality code failure threshold by an offset amount, to provide a buffer range that reduces or avoids the occurrence of a decoding failure. According to some example embodiments, in the instance of a decoding failure retransmission request may be necessary.

According to some example embodiments, because the optimization link quality threshold and the link quality code failure threshold may be defined based on an error rate, the optimization link quality threshold and the link quality code failure threshold may be statically defined. However, the link quality metric value may change with changing conditions of the communications link 101, even in the absence of forced changes based on a modification of a transmission parameter. As such, the offset between the optimization link quality threshold and the link quality code failure threshold may be set such that changes to the link quality metric value are unlikely to result in a the link quality metric value exceeding the link quality code failure threshold. According to some example embodiments, the optimization link quality threshold may be defined as a threshold range to reduce the instances of repeated transmission parameter modification due to relatively minor changes in the link quality metric value.

As such, via the analysis performed at the link analyzer 150, the link quality metric value may updated to determine if a relationship between the link quality metric value and the optimization link quality threshold warrants the generation and provision of a link feedback control to modify a transmission parameter for optimization. In this regard, the link quality metric value may be updated, for example, at regular time interval. According to some example embodiments, the link quality metric value may be updated based on a bit count of received bits (e.g., every 1,000,000 bits) in the demodulated coded information. Further, according to some example embodiments, the link quality metric value may be updated based on a coded block length for the coding scheme being implemented.

Figure 3:
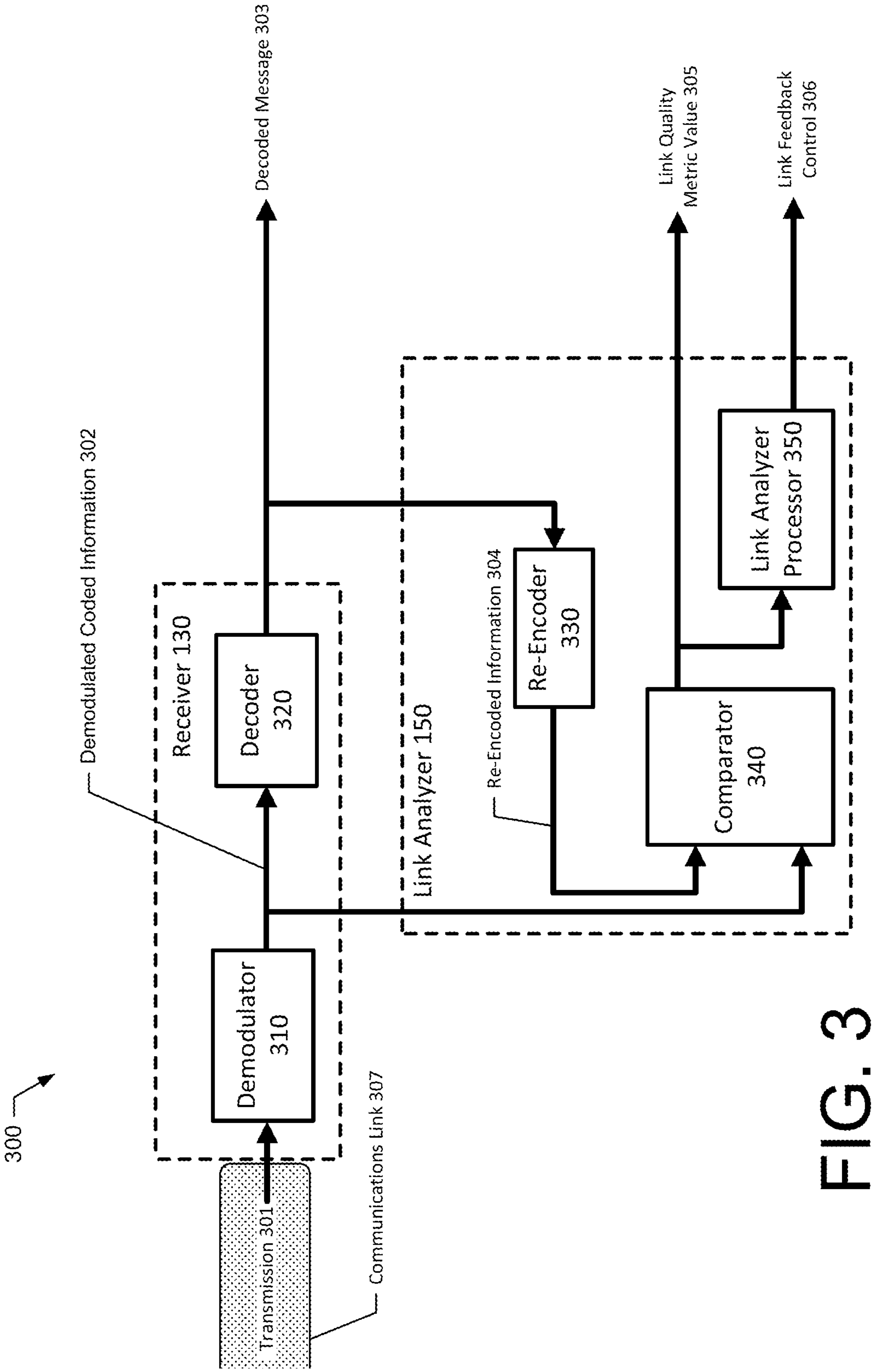
FIG. 3 illustrates an example communications receiver system configured to determine a link quality metric value according to some example embodiments.

Having described various example embodiments of communications systems, FIG. 3 will now be described, which illustrates a communications receiver system 300 comprising the receiver 130 and the link analyzer 150. As mentioned above, the receiver 130 may be a component of a transceiver, such as, for example, transceiver 230. Additionally, while the receiver 130 and the link analyzer 150 are shown in FIG. 3 as separate entities, it is understood that the receiver 130 and the link analyzer 150 may be combined into common circuitry, for example in accordance with a software-defined radio. In some example embodiments, the functionalities of some or all of the components of the communications receiver system 300 may be implemented on, for example, an application specific integrated circuit (ASIC) or a field programmable gate array (FPGA), with peripheral passive components, to perform the functionalities of the communications receiver system 300.

The receiver 130 may comprise a demodulator 310 and a decoder 320. The demodulator 310 may configured to receive a modulated signal as a transmission 301, e.g., via an antenna (not shown), and demodulate the transmission 301 to generate a digital signal. In this regard, the demodulator 310 may be configured to demodulate the transmission 301 based on a carrier frequency for a communications link 307. The output of the demodulator 310 may be based on an encoded message within the transmission 301, and the output may be referred to as demodulated coded information 302. In the context of the receiver 130, the demodulated coded information 302 may be provided to the decoder 320 for decoding. In this regard, the decoder 320 may be configured to decode the demodulated coded information 302 based on a coding scheme being implemented by a communications system that includes the communications receiver system 300. The coding scheme may be associated with a specific coding approach and a code rate, which may be known to both the transmitting and receiving devices. As described herein, the decoding performed by the decoder 320 may comprise correcting errors in the demodulated coded information 302 by leveraging bit redundancies introduced via the encoding process at the transmitting device resulting in a decoded message 303 that is error-free. According to some example embodiments, a communications system may also employ bit interleaving in association with the decoding operation. In this regard, according to some example embodiments, the encoded message at the transmitting device may be subjected to bit interleaving which involves rearranging of the encoded bits of an encoded message based on an interleaving scheme to lessen the impact of burst or block errors that can have a greater impact on a decoding success rate to obtain an error-free message. As such, according to some example embodiments, interleaving in accordance with an interleaving scheme may be known at both the transmitting device and the receiving device, and therefore the transmitting device may preform interleaving and the receiving device (e.g., via the decoder 320) may perform a complementary interleaving operation to return the bits to the initial arrangement prior to interleaving at the transmitting device.

According to some example embodiments, the link analyzer 150 may also comprise a re-encoder 330 and a comparator 340. According to some example embodiments, the link analyzer 150 may also comprise a link analyzer processor 350. According to some example embodiments, the re-encoder 330 and the comparator 340 may be implemented by the link analyzer processor 350.

As mentioned above, the link analyzer 150 may be configured to receive the demodulated coded information 302 and the decoded message 303 as inputs and generate a link quality metric value 305 as an output. Further, according to some example embodiments, the link analyzer 150 may also be configured to generate a link feedback control 306 as an output.

In this regard, the decoded message 303 generated by the decoder 320 of the receiver 130 may be provided to the re-encoder 330 of the link analyzer 150. The re-encoder 330 may configured to encode the decoded message 303 using the coding scheme of the communications system. In this regard, the re-encoder 330 may be configured to operate in the same manner as an encoder implemented within the communications system for message transmissions. As such, in example embodiments where interleaving is implemented, the re-encoder 330 may perform interleaving on the decoded message 303 in accordance with the interleaving scheme for the communications system. Also, in example embodiments where the communications receiver system 300 comprises a transmitter for sending encoded messages, the re-encoder 330 may be embodied as the encoder used for transmissions.

Accordingly, the re-encoder 330 may be configured to encode the decoded message 303 based on a coding approach and code rate for the communications system. As mentioned above, because the decoded message 303 includes no errors as a result of the decoding performed by the decoder 320, the re-encoded information 304 may be identical to the encoded message that was generated at a transmitting device prior to modulation and transmission via the communications link 307. As such, the re-encoded information 304 may be representative of the encoded message prior to any impact by the communications link 307. Accordingly, the re-encoded information 304 is indicative of the encoded message prior to the effects of the communications link 307 and the demodulated coded information 302 is indicative of the encoded message after the effects of the communications link 307.

As such, the comparator 340 may be configured to compare the demodulated coded information 302 to the re-encoded information 304 to generate a link quality metric value 305 that is indicative of the effect of the communications link 307 on the transmission. According to some example embodiments, the comparator 340 may be implemented as a mixer. According to some example embodiments, the demodulated coded information 302 may be compared to the re-encoded information 304 on a bit-by-bit basis to identify differences (and thus bit errors) within the demodulated coded information 302. According to some example embodiments, the comparator 340 may comprise an accumulator that keeps count of a number of differences or bit errors, and this count may be, according to some example embodiments, the link quality metric value 305. As mentioned above, the number of bits that may be compared to complete a determination of a link quality metric value 305 may be based on a set time duration, a set bit count for comparison, a coded block length, or the like. In this regard, once a link quality metric value 305 determination is complete, the accumulator may be reset to begin a new link quality metric value 305 determination based on a subsequent comparison.

According to some example embodiments, the link analyzer processor 350 may be further configured to determine a link feedback control 306. The link analyzer processor 350 may be configured to generate the link feedback control 306 based on the link quality metric value 305. Further, according to some example embodiments, the link analyzer processor 350 may be configured to determine the link feedback control 306 based on a comparison of the link quality metric value 305 to an optimization link quality threshold. According to some example embodiments, the link analyzer processor 350 may be configured to generate link feedback controls 306 in an effort to maintain the link quality metric value 305 for the communications link 307 within a desired range of the optimization link quality threshold. In this regard, in a situation where the link quality is low and, for example, below the optimization link quality threshold (e.g., by at least a minimum offset), the link analyzer processor 350 may be configured to generate a link feedback control 306 that would improve the link quality. On the other hand, in a situation where the link quality is high and, for example, above the optimization link quality threshold (e.g., by at least a minimum offset), the link analyzer processor 350 may be configured to generate a link feedback control 306 that would degrade the link quality. In this regard, based on the optimization link quality threshold, the link quality may be optimized to remain within a range where, for example, a minimum transmit power level is used with a maximum data rate based on the code rate (i.e., minimum redundant coded bits), while still obtaining an error-free decoded message at the receiving device. In this regard, to modify the link quality, the link feedback control 306 may provide an instruction to a link controller at the transmitting device to modify transmission parameters, such as the transmit power level, the code rate, modulation attributes, or waveform attributes, to either improve or degrade the quality of the communications link 307. According to some example embodiments, to improve the quality of the communications link 307, increases to the transmit power level may be performed first, based on respective link feedback controls 306, until a maximum transmit power level is reached, and, subsequent further improvements to link quality may involve changes to the code rate.

Based on the foregoing, because the determination of the link quality metric value 305 is based on the bit errors that are present in the demodulated coded information 302, the link quality metric value 305 has a direct correlation with the bit error rate caused by the communications link 307. Further, the link quality metric value 305, determined as provided herein in accordance with some example embodiments, does not vary with fading conditions of the communications link 307. Therefore, no correction factor, adjustments, or other considerations due to unknown fading conditions, multipath effects, or propagation effects are necessary to determine the link quality metric value 305 as provided herein, and the link quality metric value 305 remains accurate regardless of such changing conditions to the communications link 307.

Figure 4:
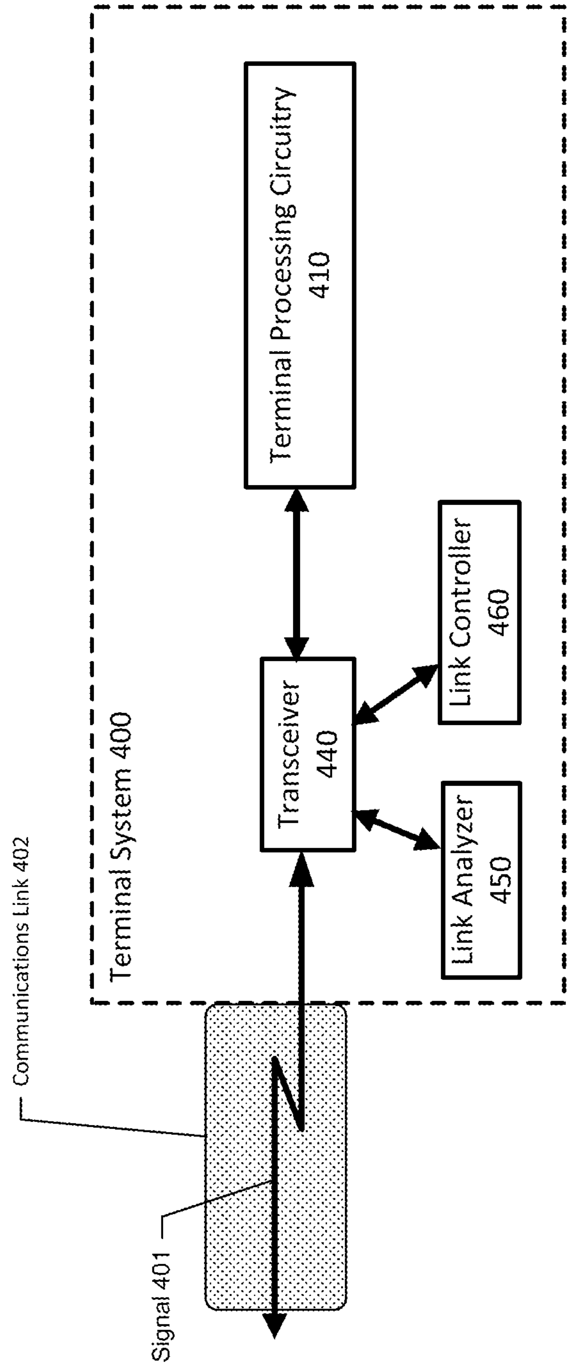
FIG. 4 illustrates an example terminal system configured to determine a link quality metric value according to some example embodiments.

Now referring to FIG. 4, an example block diagram of a terminal system 400 is provided. The terminal system 400 may be embodied as a component of variety of different computing and communication devices such as a space probe or satellite, a mobile terminal (e.g., smart phone), a terminal on a vehicle (e.g., military vehicle) such as an automobile, aircraft, ship, or the like. In this regard, in consideration of the communications system 200 of FIG. 2, the terminal system 400 comprises a transceiver 440, a link analyzer 450, and a link controller 460. Additionally, the terminal system 400 may comprise terminal processing circuitry 410, which may be configured to operate in accordance with the description of terminal A 110 or terminal B 140 provided above. In this regard, the terminal processing circuitry 410 may comprise, for example, processing and memory components configured to perform application functionalities based on sent or received communications via the transceiver 440.

Based on the foregoing, the transceiver 440 may be structured and configured to operate in the same or similar manner as the transceivers 220 and 230. In this regard, the transceiver 440 may be configured to receive a signal 401 associated with a transmitted message via the communications link 402. The transceiver 440 may be configured to demodulate the received signal 401 to generate demodulated coded information for decoding and provision to the link analyzer 450. The transceiver 440 may also be configured to decode the demodulated coded information into a decoded message for provision to the terminal processing circuitry 410 and the link analyzer 450.

The link analyzer 450 may be structured and configured to operate in the same manner as the link analyzer 150. In this regard, according to some example embodiments, the link analyzer 450 may be configured to re-encode the decoded message and compare the resulting re-encoded information with the demodulated coded information to determine a link quality metric value. According to some example embodiments, the link analyzer 450 may be further configured to generate link feedback controls to modify transmission parameters for the communications system based on the link quality metric value.

The transceiver 440 may also be configured to receive a message from the terminal processing circuitry 410 and encode the message as described herein. The encoded message may then be modulated by the transceiver 440 and transmitted as a signal 401 via the communications link 402. According to some example embodiments, the transceiver 440 may be controlled by the link controller 460, which may be structured and configured to operate in the same manner as the link controller 260. The link controller 460 may be configured to control the transceiver 440 to transmit the signal 401 in accordance with a transmit power level indicated by a previously received link feedback control. Additionally, the transceiver 440 may also be configured to encode the message based on a code rate as indicated by a previously received link feedback control.

Figure 5:
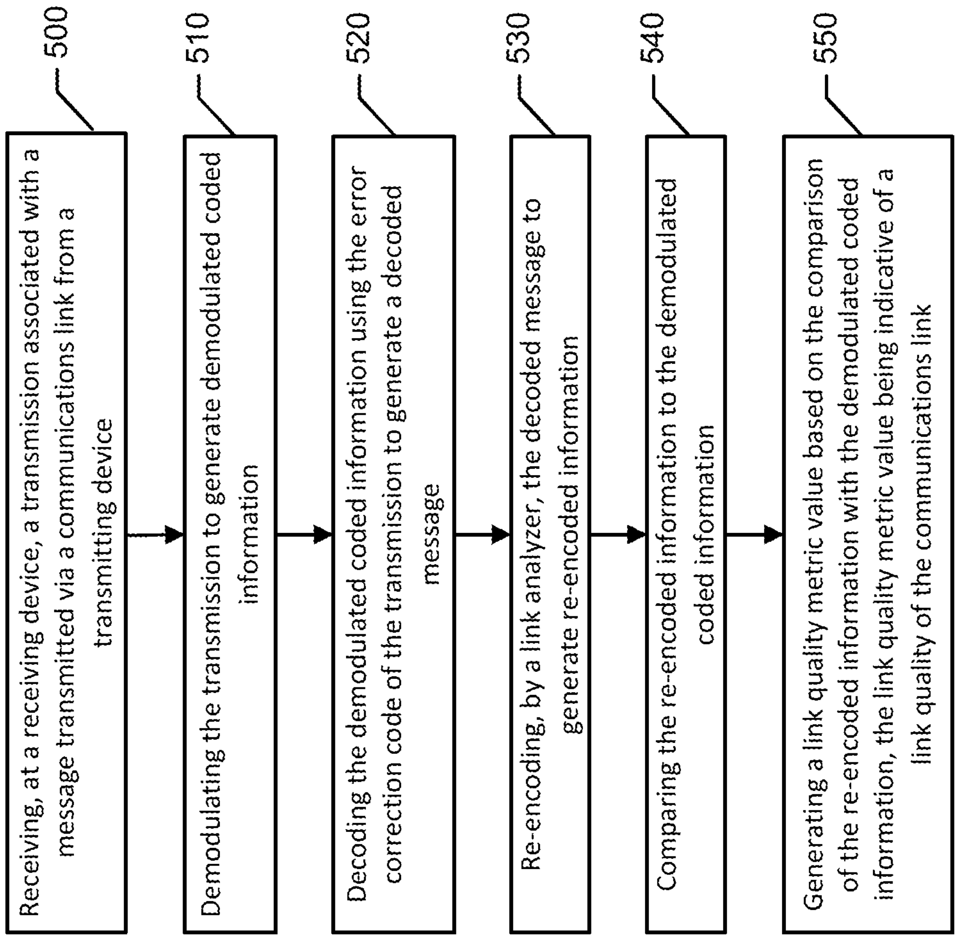
FIG. 5 illustrates a flow chart of an example method for determining a link quality metric according to some example embodiments.

Referring now to the flowchart of FIG. 5, a method for determining a quality of a communications link, according to some example embodiments, is described. The example method may comprise, at 500, receiving, at a receiving device (e.g., receiver 130, transceiver 230, or the like), a transmission associated with a message transmitted via a communications link from a transmitting device (e.g., transmitter 120, transceiver 220, or the like). At 510, the example method may further comprise demodulating the transmission to generate demodulated coded information, and, at 520, the example method may comprise decoding the demodulated coded information using the error correction code of the transmission to generate a decoded message. Further, at 530, the example method may comprise re-encoding, by a link analyzer, the decoded message to generate re-encoded information. At 540, the example method may comprise comparing the re-encoded information to the demodulated coded information. Additionally, at 550, the example method may comprise generating a link quality metric value based on the comparison of the re-encoded information with the demodulated coded information. In this regard, the link quality metric value may be indicative of a link quality of the communications link.

According to some example embodiments, the example method may further comprise determining a link feedback control based on the link quality metric value. The link feedback control may be generated for transmitting to the transmitting device to modify a transmission parameter for use with the communications link. In this regard, according to some example embodiments, the transmission parameter may be a transmit power level, a code rate, modulation attributes, waveform attributes, or the like. According to some example embodiments, the example method may additionally or alternatively, comprise determining a link feedback control based on the link quality metric value, and transmitting the link feedback control to the transmitting device for modifying a transmission parameter to be used with future transmissions on the communications link.

Further, in view of the foregoing, an example communications system is provided in accordance with some example embodiments. The example communications system may comprise a transmitter, a receiver, and a link analyzer. The transmitter may be configured to encode a message with an error correction code, and modulate and transmit the encoded message via a communications link. The receiver may be configured to receive a transmission associated with the message via the communications link, and demodulate the transmission to generate demodulated coded information. The receiver may be further configured to decode the demodulated coded information using the error correction code to generate a decoded message. The link analyzer may be configured to re-encode the decoded message to generate re-encoded information, compare the re-encoded information to the demodulated coded information, and generate a link quality metric value based on the comparison of the re-encoded information with the demodulated coded information. In this regard, the link quality metric value may be indicative of a link quality of the communications link.

Additionally, according to some example embodiments, the link analyzer may be further configured to determine a link feedback control based on the link quality metric value. The link feedback control may be being generated to modify a transmission parameter for use with the communications link. According to some example embodiments, the transmission parameter may be a transmit power level, a code rate, modulation attributes, waveform attributes, or the like. Additionally or alternatively, according to some example embodiments, the encoded message may be a first encoded message, and the communications system may further comprise a link controller, a first transceiver comprising the transmitter, and a second transceiver comprising the receiver. The link analyzer may be further configured to determine a link feedback control based on the link quality metric value, and the second transceiver may be configured to transmit the link feedback control to the first transceiver for provision to the link controller. The link controller may be configured to control the first transceiver to transmit a second encoded message via the communications link with a modified transmission parameter, relative to the transmitting of the first encoded message, based on the link feedback control. According to some example embodiments, the modified transmission parameter may be a modified transmit power level, a modified code rate, modified modulation attributes, modified waveform attributes, or the like.

Additionally, according to some example embodiments, the modified transmission parameter may be a modified transmit power level, and the link controller may be configured to control the first transceiver, based on the link feedback control, to transmit the second encoded message via the communications link with a lower transmit power level to reduce the link quality of the communications link. Additionally or alternatively, according to some example embodiments, the modified transmission parameter may be a modified code rate, and the link controller may be configured to control the first transceiver, based on the link feedback control, to transmit the second encoded message via the communications link with an increased code rate to reduce the link quality of the communications link. According to some example embodiments, the link analyzer may be further configured to determine the link feedback control based on a relationship between the link quality metric value and an optimization link quality threshold.

Additionally or alternatively, according to some example embodiments, the receiver may be configured to decode the demodulated coded information based a coded block length for the error correction code used to perform the decoding. Additionally or alternatively, according to some example embodiments, the receiver may be further configured to perform interleaving in association with the demodulated coded information to generate the decoded message.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A communications system comprising:

a transmitter configured to:

encode a message with an error correction code; and modulate and transmit the encoded message via a communications link;

a receiver configured to:

receive a transmission associated with the message via the communications link;

demodulate the transmission to generate demodulated coded information; and decode the demodulated coded information using the error correction code to generate a decoded message; and a link analyzer configured to:

re-encode the decoded message to generate re-encoded information;

determine a difference between the re-encoded information and the demodulated coded information; and generate a link quality metric value based on the difference between the re-encoded information and the demodulated coded information, the link quality metric value being indicative of a link quality of the communications link; and determine a link feedback control parameter for the transmitter based on the link quality metric value;

wherein the receiver is further configured to transmit the link feedback control parameter to the transmitter, and wherein the transmitter is further configured to modify a transmission parameter for a future transmission based on the link feedback control parameter.

2. The communications system of claim 1, wherein the transmission parameter is a transmit power level or a code rate.

3. The communications system of claim 1, wherein the encoded message is a first encoded message;

wherein the communications system further comprises:

a link controller;

a first transceiver comprising the transmitter; and a second transceiver comprising the receiver;

wherein the link analyzer is further configured to determine a link feedback control based on the link quality metric value;

wherein the second transceiver is configured to transmit the link feedback control to the first transceiver for provision to the link controller; and wherein the link controller is configured to control the first transceiver to transmit a second encoded message via the communications link with a modified transmission parameter, relative to the transmitting of the first encoded message, based on the link feedback control.

4. The communications system of claim 3, wherein the modified transmission parameter is a modified transmit power level, a modified code rate, modified modulation attributes, or modified waveform attributes.

5. The communications system of claim 3, wherein the modified transmission parameter is a modified transmit power level; and wherein the link controller is configured to control the first transceiver, based on the link feedback control, to transmit the second encoded message via the communications link with a lower transmit power level to reduce the link quality of the communications link.

6. The communications system of claim 3, wherein the modified transmission parameter is a modified code rate; and wherein the link controller is configured to control the first transceiver, based on the link feedback control, to transmit the second encoded message via the communications link with an increased code rate to reduce the link quality of the communications link.

7. The communications system of claim 3, wherein the link analyzer is further configured to determine the link feedback control based on a relationship between the link quality metric value and an optimization link quality threshold.

8. The communications system of claim 1, wherein the receiver is configured to decode the demodulated coded information based a coded block length for the error correction code used to perform the decoding.

9. The communications system of claim 1, wherein the receiver is further configured to perform interleaving in association with the demodulated coded information to generate the decoded message.

10. A communications receiver system comprising:

a receiver configured to:

receive, from a transmitting device, a transmission associated with a message via a communications link;

demodulate the transmission to generate demodulated coded information; and decode the demodulated coded information using an error correction code for the transmission to generate a decoded message; and a link analyzer configured to:

receive the demodulated coded information and decoded message;

re-encode the decoded message to generate re-encoded information;

determine a difference between the re-encoded information and the demodulated coded information; and generate a link quality metric value based on the difference between the re-encoded information with the demodulated coded information, the link quality metric value being indicative of a link quality of the communications link.

11. The communications receiver system of claim 10, wherein the link analyzer is further configured to determine a link feedback control based on the link quality metric value, the link feedback control being generated for transmitting to the transmitter to modify a transmission parameter for use with the communications link.

12. The communications receiver system of claim 10 further comprising a transceiver;

wherein the link analyzer is further configured to determine a link feedback control based on the link quality metric value; and wherein the transceiver is configured to transmit the link feedback control to the transmitting device for modifying a transmission parameter to be used with future transmissions on the communications link.

13. The communications receiver system of claim 12, wherein the transmission parameter is a transmit power level or a code rate.

14. The communications system of claim 12, wherein the transmission parameter is a transmit power level that is less than a previous transmit power level to reduce the link quality of the communications link.

15. The communications system of claim 12, wherein the transmission parameter is a code rate that is higher than a previous code rate to reduce the link quality of the communications link.

16. A method for determining a quality of a communications link, the method comprising:

receiving, at a receiving device, a transmission associated with a message transmitted via a communications link from a transmitting device;

demodulating the transmission to generate demodulated coded information;

decoding the demodulated coded information using an error correction code of the transmission to generate a decoded message;

re-encoding, by a link analyzer, the decoded message to generate re-encoded information;

determining a difference between the re-encoded information and the demodulated coded information;

generating a link quality metric value based on the difference between the re-encoded information with the demodulated coded information, the link quality metric value being indicative of a link quality of the communications link;

determining a link feedback control parameter for the transmitting device based on the link quality metric value; and transmitting the link feedback control to the transmitting device for modifying a transmission parameter to be used with future transmissions on the communications link.

17. The method of claim 16, wherein the transmission parameter is a transmit power level or a code rate.

* * * * *